United States Patent
Li et al.

(10) Patent No.: US 12,526,808 B2
(45) Date of Patent: Jan. 13, 2026

(54) INFORMATION PROCESSING METHOD AND APPARATUS, AND USER EQUIPMENT

(71) Applicant: VIVO MOBILE COMMUNICATION CO., LTD., Guangdong (CN)

(72) Inventors: Na Li, Guangdong (CN); Xiaodong Shen, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 405 days.

(21) Appl. No.: 18/106,246

(22) Filed: Feb. 6, 2023

(65) Prior Publication Data
US 2023/0189274 A1 Jun. 15, 2023

Related U.S. Application Data

(63) Continuation of application No. PCT/CN2021/110256, filed on Aug. 3, 2021.

(30) Foreign Application Priority Data

Aug. 7, 2020 (CN) .......................... 202010791261.5

(51) Int. Cl.
*H04W 72/21* (2023.01)
*H04W 72/563* (2023.01)
*H04W 72/0446* (2023.01)

(52) U.S. Cl.
CPC ......... *H04W 72/21* (2023.01); *H04W 72/563* (2023.01); *H04W 72/0446* (2013.01)

(58) Field of Classification Search
CPC ... H04L 1/0026; H04L 1/1671; H04L 5/0055; H04L 5/0057; H04L 5/0094;
(Continued)

(56) References Cited

U.S. PATENT DOCUMENTS 11,985,667 B2 * 5/2024 Zhao ..................... H04W 72/23
2019/0223205 A1 7/2019 Papasakellariou
(Continued)

FOREIGN PATENT DOCUMENTS

CN 110149705 A 8/2019
CN 110661607 A 1/2020
(Continued)

OTHER PUBLICATIONS

Extended European Search Report for Application No. 21852229.0, dated Apr. 25, 2024, 12 Pages.
(Continued)

*Primary Examiner* — Robert J Lopata
(74) *Attorney, Agent, or Firm* — BROOKS KUSHMAN P.C.

(57) ABSTRACT

An information processing method and apparatus, and user equipment. The method includes: in a case that a time domain resource of an uplink data channel overlaps that of at least one uplink control channel, processing at least one piece of UCI according to first target information, where the at least one piece of UCI is UCI carried on the at least one uplink control channel or includes UCI carried on the uplink data channel and UCI carried on the at least one uplink control channel, and the first target information includes at least one of the following: priority information, type information of information carried on the uplink data channel, or type information of the UCI carried on the at least one uplink control channel.

12 Claims, 4 Drawing Sheets

---

In a case that a time domain resource of an uplink data channel overlaps that of at least one uplink control channel, UE obtains first target information — 201

The UE processes at least one piece of UCI according to the first target information — 202

(58) Field of Classification Search
CPC . H04W 72/0446; H04W 72/21; H04W 72/56; H04W 72/563
USPC .......................................................... 370/329
See application file for complete search history.

(56) References Cited

U.S. PATENT DOCUMENTS

| | | | |
|---|---|---|---|
| 2019/0261391 A1 | 8/2019 | Kundu et al. | |
| 2020/0022161 A1 | 1/2020 | Yang et al. | |
| 2021/0007119 A1 | 1/2021 | Li et al. | |
| 2021/0352741 A1 | 11/2021 | Mo et al. | |
| 2022/0368504 A1* | 11/2022 | Zhao | H04L 1/1854 |
| 2022/0394707 A1* | 12/2022 | Chen | H04L 1/1854 |
| 2023/0042299 A1* | 2/2023 | Zhou | H04W 72/0446 |
| 2023/0075353 A1* | 3/2023 | Zeng | H04W 72/0446 |
| 2023/0105294 A1* | 4/2023 | Park | H04W 72/569 370/329 |
| 2023/0171751 A1* | 6/2023 | Li | H04L 5/0053 370/329 |
| 2023/0232394 A1* | 7/2023 | Yuan | H04L 5/0044 370/329 |

FOREIGN PATENT DOCUMENTS

| | | |
|---|---|---|
| CN | 111278142 A | 6/2020 |
| CN | 111278143 A | 6/2020 |
| WO | 2017223196 A1 | 12/2017 |
| WO | 2019154357 A1 | 8/2019 |
| WO | 2020065724 A1 | 4/2020 |

OTHER PUBLICATIONS

Ericsson "On UCI Multiplexing on PUSCH" 3GPP TSG-RAN WG1 Meeting #93, Busan, Korea, May 2018, R1-1807253, 6 Pages.

Intel Corporation "Remaining details on NR PUCCH" 3GPP TSG RAN WG1 Meeting #94bis, Chengdu, China, Oct. 2018, R1-1810755, 7 Pages.

Huawei, HiSilicon "Clarification on UCI multiplexing on PUSCH" 3GPPTSG RAN WG1 Meeting #101-e, E-meeting, May 2020, RI-2004614, 3 Pages.

First Office Action for Japanese Application No. 2023-508593, dated Jan. 25, 2024, 5 Pages.

MediaTek Inc. Multiple HARQ procedures and intra-UE UCI prioritization 3GPP TSG RAN WG1 Meeting #98bis, Chongqing, China, Oct. 2019, R1-1911079., 13 Pages.

First Office Action for Chinese Application No. 202010791261.5, dated Oct. 8, 2022, 7 Pages.

Vivo, "Remaining issues on UCI multiplexing" 3GPP TSG RAN WG1 NR Meeting AH 1801, Canada, Vancouver, Jan. 2018, R1-1800995, 24 Pages.

International Search Report and Written Opinion for Application No. PCT/CN2021/110256, dated Oct. 18, 2021, 7 Pages.

Qualcomm Incorporated, "Remaining issues for multiplexing UCI on PUSCH" 3GPP TSG RAN WG1 Meeting AH 1801, Vancouver, Canada, Jan. 2018, R1-1801000, 13 Pages.

Lenovo, Motorola Mobility, "Remaining issues on UCI multiplexing on PUSCH" 3GPP TSG RAN WG1 Meeting #93, Busan, Korea, May 2018, R1-1807604, 6 Pages.

* cited by examiner

INFORMATION PROCESSING METHOD AND APPARATUS, AND USER EQUIPMENT

CROSS-REFERENCE TO RELATED APPLICATIONS

This application is a continuation of International Application No. PCT/CN2021/110256 filed on Aug. 3, 2021, which claims priority to Chinese Patent Application No. 202010791261.5, filed on Aug. 7, 2020, which are incorporated herein by reference in their entireties.

TECHNICAL FIELD

This application pertains to the field of communications technologies, and specifically relates to an information processing method and apparatus, and user equipment.

BACKGROUND

In a new radio (NR) system, user equipment (UE) can support different services. For example, the UE can support an ultra-reliable and low latency communications service (URLLC service) and a high-capacity and high-rate service (eMBB service). However, because different channels have different start symbols and lengths, transmission resources may overlap in time domain.

Currently, when a time domain resource of a physical uplink control channel (PUCCH) and a time domain resource of a physical uplink shared channel (PUSCH) that are corresponding to a same priority overlap, the UE may multiplex uplink control information (UCI) on the PUSCH for transmission. When a time domain resource of a PUCCH and a time domain resource of a PUSCH that are corresponding to different priorities overlap, the UE cancels transmission of a low-priority channel and transmits only a high-priority channel.

However, for a PUCCH and a PUSCH corresponding to different priorities, the UE cancels transmission of a low-priority channel, and consequently, UCI carried on the low-priority channel cannot be transmitted, thereby reducing performance of uplink transmission.

SUMMARY

Embodiments of this application provide an information processing method and apparatus, and user equipment.

According to a first aspect, an embodiment of this application provides an information processing method. The information processing method includes: in a case that a time domain resource of an uplink data channel overlaps that of at least one uplink control channel, processing, by UE, at least one piece of UCI according to first target information, where the at least one piece of UCI is UCI carried on the at least one uplink control channel, or the at least one piece of UCI includes UCI carried on the uplink data channel and UCI carried on the at least one uplink control channel, and the first target information includes at least one of the following: priority information, type information of information carried on the uplink data channel, or type information of the UCI carried on the at least one uplink control channel, where the priority information is used to indicate a priority of the uplink data channel and a priority of the at least one uplink control channel.

According to a second aspect, an embodiment of this application provides an information processing apparatus. The information processing apparatus includes a processing module. The processing module is configured to: in a case that a time domain resource of an uplink data channel overlaps that of at least one uplink control channel, process at least one piece of UCI according to first target information, where the at least one piece of UCI is UCI carried on the at least one uplink control channel, or the at least one piece of UCI includes UCI carried on the uplink data channel and UCI carried on the at least one uplink control channel, and the first target information includes at least one of the following: priority information, type information of information carried on the uplink data channel, or type information of the UCI carried on the at least one uplink control channel, where the priority information is used to indicate a priority of the uplink data channel and a priority of the at least one uplink control channel.

According to a third aspect, an embodiment of this application provides UE. The UE includes a processor, a memory, and a program or an instruction that is stored in the memory and that can be run on the processor, where when the program or the instruction is executed by the processor, the steps of the information processing method in the first aspect are implemented.

According to a fourth aspect, an embodiment of this application provides a readable storage medium. The readable storage medium stores a program or an instruction, and when the program or the instruction is executed by a processor, the steps of the information processing method in the first aspect are implemented.

According to a fifth aspect, an embodiment of this application provides a chip. The chip includes a processor and a communications interface, the communications interface is coupled to the processor, and the processor is configured to run a program or an instruction to implement the information processing method in the first aspect.

In the embodiments of this application, in a case that a time domain resource of an uplink data channel overlaps that of at least one uplink control channel, UE may process at least one piece of UCI according to first target information. For the uplink control channel and the uplink data channel corresponding to different priorities, when the time domain resource of the uplink control channel overlaps that of the uplink data channel, the UE may process the at least one piece of UCI according to priority information of a channel, type information of information carried on the uplink data channel, and/or type information of UCI carried on the uplink control channel, to transmit some or all UCI carried on the uplink data channel. That is, a possibility of transmitting low-priority information is improved while ensuring transmission of a high-priority channel, thereby reducing impact on performance of low-priority uplink transmission. In this way, performance of uplink transmission can be improved.

DETAILED DESCRIPTION

Figure 1:
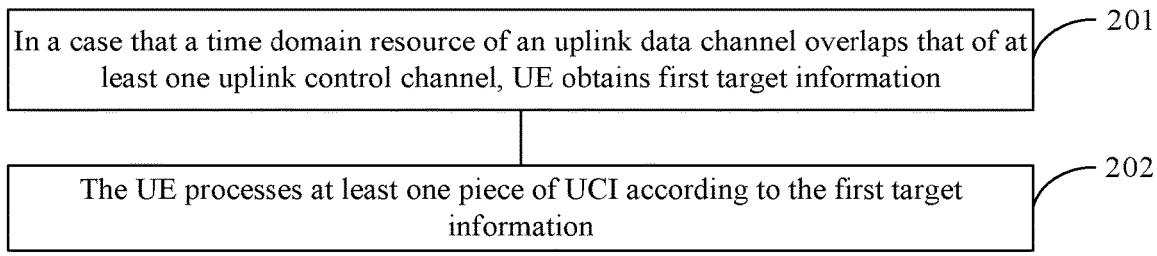
FIG. 1 is a schematic diagram of an information processing method according to an embodiment of this application.

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

In the specification and claims of this application, the terms "first", "second", and the like are intended to distinguish between similar objects but do not describe a specific order or sequence. It should be understood that, the terms termed in such a way are interchangeable in proper circumstances, so that the embodiments of this application can be implemented in an order other than the order illustrated or described herein. Objects classified by "first", "second", and the like are usually of a same type, and the number of objects is not limited. For example, there may be one or more first objects. In addition, in the specification and the claims, "and/or" represents at least one of connected objects, and a character "/" generally represents an "or" relationship between associated objects.

The following describes some concepts and/or terms in an information processing method and apparatus, and user equipment provided in the embodiments of this application.

Conflict processing between a PUCCH and a PUSCH:

In a PUCCH group (PUCCH group), regardless of whether the PUCCH and the PUSCH are in a same serving cell or different serving cells, simultaneous transmission of the PUCCH and the PUSCH is not supported. Therefore, when a time domain resource of the PUCCH overlaps that of the PUSCH (including partial overlapping and all overlapping), UE performs dropping (for example, if a scheduling request (SR) PUCCH overlaps a PUSCH without uplink shared channel (UL-SCH), the UE drops the PUSCH and transmits the SR PUCCH) or multiplexes UCI on the PUSCH for transmission (for example, a HARQ-ACK/CSI PUCCH overlaps the PUSCH, the UE multiplexes hybrid automatic repeat request-acknowledgment (HARQ-ACK)/channel state information (CSI) on the PUSCH for transmission) according to a corresponding rule in a case that a specified time requirement is met. Specifically, the UE first processes a conflict between a plurality of PUCCHs, and a result of the processing is one or more non-overlapping PUCCHs. Then, the UE processes a conflict between the PUCCH and the PUSCH. If the PUCCH overlaps only one PUSCH, the UE multiplexes the UCI (excluding the SR) on the PUSCH. If the PUCCH overlaps only a plurality of PUSCHs, the UE selects one PUSCH for multiplexing according to a corresponding rule. The rule is as follows:

First priority: PUSCH with A-CSI

Second priority: PUSCH with an earliest start slot

Third priority: Dynamic scheduling PUSCH>configured grant PUSCH or semi-persistent PUSCH (semi-persistent on PUSCH)

Fourth priority: PUSCH with a small priority index (index) of a serving cell>PUSCH with a large index of a serving cell Fifth priority: PUSCH transmitted early>PUSCH transmitted late When the UCI is multiplexed on the PUSCH for transmission (except the SR), and reliability requirements of different types of UCI, such as a HARQ-ACK, a CSI part 1, and a CSI part 2, are different, bit rates of the different types of UCI during multiplexing on the PUSCH are different. Therefore, the UCI needs to be separately coded and mapped.

Priority mechanism of the PUCCH and the PUSCH in NR:

In NR, UE can support different services at the same time, and the different services correspond to different service requirements, such as a latency and reliability. Therefore, a mechanism for marking a channel priority of the PUCCH/PUSCH is introduced. Specifically, a 2-level physical layer priority, that is, a high priority and a low priority, is introduced. For example, priorities of a configured grant (CG) PUSCH, a semi-persistent scheduling (SPS) PDSCH, and a release (release) HARQ-ACK are configured by using radio resource control (RRC) signaling, a PUCCH corresponding to persistent scheduling CSI (P-CSI) or semi-persistent scheduling CSI (SP-CSI) is a low priority, and a PUSCH corresponding to a dynamic scheduling HARQ-ACK, a DG PUSCH, and A-CSI/SP-CSI is indicated by corresponding scheduling DCI. The priority of the PUCCH is determined by a HARQ-ACK/SR/CSI carried on the PUCCH. When time domain resource of the PUCCH and the PUSCH that are corresponding to different priorities overlap, the UE cancels/drops transmission of a low-priority channel, and transmits only a high-priority channel.

When time domain resources of different channels overlap, if the channels are of a same priority, processing is performed according to a multiplexing rule defined in the protocol. If the channels are of different priorities, the UE drops a low-priority channel, and transmits a high-priority channel. If the case of same priority and the case of different priorities exist, the UE first performs processing according to the multiplexing rule defined in the protocol, and then processes channels of different priorities. When the UE processes different priorities, the low-priority channel is dropped, and a processing time is required for transmitting the high-priority channel. In the protocol, a dropping/canceling time requirement when the UE processes channels of different priorities is defined.

It should be noted that, the technologies described in the embodiments of this application are not limited to a Long Term Evolution (LTE)/LTE-Advanced (LTE-A) system, and can also be used in other wireless communications systems such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and another system. The terms "system" and "network" in the embodiments of this application may be used interchangeably. The technologies described can be applied to both the systems and the radio technologies mentioned above as well as to other systems and radio technologies. However, the following descriptions describe a new radio (NR) system for example purposes, and NR terms are used in most of the following descriptions, although these technologies can also be applied to an application other than an NR system application, for example, a $6^{th}$ generation (6G) communications system.

The UE in the embodiments of this application may also be referred to as a terminal device. The UE may be a terminal side device such as a mobile phone, a tablet personal computer (tablet personal computer), a laptop computer (laptop computer) or a notebook computer, a personal digital assistant (PDA), a palmtop computer, a netbook, an ultra-mobile personal computer (UMPC), a mobile internet device (MID), a wearable device (wearable device), vehicle user equipment (VUE), or pedestrian user equipment (PUE). The wearable device includes a bracelet, a headset, glasses, and the like. It should be noted that a specific type of the UE is not limited in the embodiments of this application.

The network device in the embodiments of this application may be a base station or a core network. The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a transmitting receiving point (TRP), or another appropriate term in the art. As long as a same technical effect is achieved, the base station is not limited to a specified technical term. It should be noted that, in the embodiments of this application, only a base station in an NR system is used as an example, but a specific type of the base station is not limited.

With reference to the accompanying drawings, the information processing method provided in the embodiments of this application is described in detail by using specific embodiments and application scenarios.

An embodiment of this application provides an information processing method. FIG. 1 is a flowchart of an information processing method according to an embodiment of this application. The method may be applied to UE. As shown in FIG. 1, the information processing method provided in this embodiment of this application may include the following steps 201 and step 202.

Step 201: In a case that a time domain resource of an uplink data channel overlaps that of at least one uplink control channel, UE obtains first target information.

Step 202: The UE processes at least one piece of UCI according to the first target information.

In this embodiment of this application, the at least one piece of UCI is UCI carried on the at least one uplink control channel, or the at least one piece of UCI includes UCI carried on the uplink data channel and UCI carried on the at least one uplink control channel. The first target information includes at least one of the following: priority information, type information of information carried on the uplink data channel, or type information of UCI carried on the at least one uplink control channel, where the priority information is used to indicate a priority of the uplink data channel and a priority of the at least one uplink control channel.

It should be noted that each of the at least one uplink control channel may carry one or more pieces of UCL. In a case that the at least one piece of UCI is the UCI carried on the at least one uplink control channel, the at least one piece of UCI may be a part or all of the UCI carried on the at least one uplink control channel.

It should be noted that, in a case that the first target information includes the type information of the UCI carried on the at least one uplink control channel (or further includes the priority information), the at least one piece of UCI is the UCI carried on the at least one uplink control channel. In a case that the first target information includes the type information of the information carried on the uplink data channel and the type information of the UCI carried on the at least one uplink control channel (or further includes the priority information), the at least one piece of UCI is the UCI carried on the at least one uplink control channel, or the at least one piece of UCI includes the UCI carried on the uplink data channel and the UCI carried on the at least one uplink control channel.

It can be understood that in a case that the uplink data channel does not carry related information (for example, UCI or an uplink shared channel), the UE may process the at least one piece of UCI (that is, the UCI carried on the at least one uplink control channel) according to the type information of the UCI carried on the at least one uplink control channel (or further including the priority information). In an implementation, the UE may multiplex the at least one piece of UCI on the uplink data channel for transmission. In another implementation, the UE may multiplex a part of the at least one piece of UCI on the uplink data channel for transmission, and drop the other part of the UCI (that is, do not transmit the other part of the UCI); or the UE may determine, according to a type of each piece of UCI, to multiplex the UCI on the uplink data channel for transmission or drop the UCI.

It can be understood that, in a case that the uplink data channel carries the related information, the UE may process the at least one piece of UCI (that is, he UCI carried on the at least one uplink control channel, or the UCI carried on the uplink data channel and the UCI carried on the at least one uplink control channel) according to the type information of the information carried on the uplink data channel and the type information of the UCI carried on the at least one uplink control channel (or further including the priority information). In an implementation, the UE may multiplex the UCI carried on the at least one uplink control channel on the uplink data channel for transmission. In another implementation, the UE may multiplex a part of the UCI carried on the at least one uplink control channel on the uplink data channel for transmission, and drop the other part of the UCI. In still another implementation, the UE may drop the UCI carried on the uplink data channel, and multiplex the UCI carried on the at least one uplink control channel on the uplink data channel for transmission. In still another implementation, the UE may drop a part of the UCI carried on the uplink data channel, and multiplex the UCI carried on the at least one uplink control channel on the uplink data channel for transmission.

Optionally, in this embodiment of this application, the UCI carried on the at least one uplink control channel includes at least one of the following types of information: first HARQ-ACK information, second HARQ-ACK information, first CSI, second CSI, or an SR. The first HARQ-ACK information is HARQ-ACK information carried on a high-priority uplink control channel, the second HARQ-ACK information is HARQ-ACK information carried on a low-priority uplink control channel, the first CSI is a first part of a CSI report, the second CSI is a second part of the CSI report, and the SR may be a high-priority SR or a low-priority SR.

It should be noted that the first HARQ-ACK information may be referred to as a high-priority HARQ-ACK (HP HARQ-ACK), for example, a HARQ-ACK corresponding to a second HARQ-ACK codebook; the second HARQ-ACK information may be referred to as a low-priority HARQ-ACK (LP HARQ-ACK), for example, a HARQ-ACK corresponding to a first HARQ-ACK codebook; the first CSI may be referred to as a CSI part 1, and the second CSI may be referred to as a CSI part 2. It should be noted that the one or more pieces of UCI indicate one or more UCI types, such as the low-priority HARQ-ACK, the CSI part 1, and the CSI part 2, and the high-priority HARQ-ACK.

It should be noted that the at least one piece of UCI may be carried on one PUCCH or separately carried on different PUCCHs, or a part of the at least one piece of UCI is carried on one different PUCCH, and the remaining UCI is carried on one PUCCH.

Optionally, in this embodiment of this application, the UCI carried on the at least one uplink control channel includes the first HARQ-ACK information; or the UCI carried on the at least one uplink control channel includes the second HARQ-ACK information; or the UCI carried on the at least one uplink control channel includes the first HARQ-ACK information and the second HARQ-ACK information; or the UCI carried on the at least one uplink control channel includes target CSI (that is, the first CSI, or the first CSI and the second CSI); or the UCI carried on the at least one uplink control channel includes the first HARQ-ACK information and the target CSI; or the UCI carried on the at least one uplink control channel includes the second HARQ-ACK information and the target CSI; or the UCI carried on the at least one uplink control channel includes the first HARQ-ACK information, the second HARQ-ACK information, and the target CSI; or the UCI carried on the at least one uplink control channel includes the SR.

Optionally, in this embodiment of this application, the information carried on the uplink data channel includes any one of the following types of information: aperiodic channel state information (A-CSI), semi-persistent channel state information (SP-CSI), an uplink shared channel (UL-SCH), and second target information, where the second target information includes A-CSI and a UL-SCH.

Optionally, in this embodiment of this application, the uplink control channel may be a PUCCH, and the uplink data channel may be a PUSCH.

It should be noted that the priority in this embodiment of this application is a physical layer priority, for example, may be represented by a priority index (index). For example, that the priority of the uplink data channel is higher than the priority of the uplink control channel may be understood as: a physical layer priority of the uplink data channel is higher than a physical layer priority of the uplink control channel (that is, a priority index of the uplink data channel is greater than a priority index of the uplink control channel).

Optionally, in this embodiment of this application, in a case that the priority of the at least one uplink control channel is different from the priority of the uplink data channel and the time domain resource of the uplink data channel overlaps that of the at least one uplink control channel, the UE may process the at least one piece of uplink control information (UCI) according to the first target information. Alternatively, in a case that apriority of a part of the at least one uplink control channel is different from the priority of the uplink data channel and the time domain resource of the uplink data channel overlaps that of the at least one uplink control channel, the UE may process the at least one piece of uplink control information (UCI) according to the first target information.

It should be noted that a time domain resource of an uplink data channel overlaps that of at least one uplink control channel may be understood as: the time domain resource of the uplink data channel completely overlaps that of the at least one uplink control channel, or the time domain resource of the uplink data channel partially overlaps that of the at least one uplink control channel.

It should be noted that the uplink data channel may be one or more uplink data channels. For example, that the UE multiplexes the at least one piece of UCI on the uplink data channel may be understood as: the UE multiplexes the at least one piece of UCI on one uplink data channel in the uplink data channels, or multiplexes the at least one piece of UCI on a plurality of uplink data channels in the uplink data channels.

According to the information processing method provided in this embodiment of this application, in a case that a time domain resource of an uplink data channel overlaps that of at least one uplink control channel, UE may process at least one piece of UCI according to first target information. For the uplink control channel and the uplink data channel corresponding to different priorities, when the time domain resource of the uplink control channel overlaps that of the uplink data channel, the UE may process the at least one piece of UCI according to priority information of a channel, type information of information carried on the uplink data channel, and/or type information of UCI carried on the uplink control channel, to transmit some or all UCI carried on the uplink data channel. That is, a possibility of transmitting low-priority information is improved while ensuring transmission of a high-priority channel, thereby reducing impact on performance of low-priority uplink transmission. In this way, performance of uplink transmission can be improved.

Optionally, in an implementation of this embodiment of this application, the at least one piece of UCI is the UCI carried on the at least one uplink control channel, and the first target information includes the priority information and the type information of the UCI carried on the at least one uplink control channel. The foregoing step 202 may be specifically implemented by the following step 202*a*, step 202*b*1, or step 202*b*2.

Step 202*a*: If the priority of the uplink data channel is higher than the priority of the at least one uplink control channel and the UCI carried on the at least one uplink control channel includes target CSI, the UE drops the target CSI, and transmits the uplink data channel;

In this embodiment of this application, the target CSI is the first CSI, or the target CSI includes the first CSI and the second CSI.

In this embodiment of this application, in a case that a time domain resource of an HP PUSCH (without (without) A-CSI/SP-CSI) overlaps that of an LP CSI PUCCH, the UE may drop LP CSI.

Step 202*b*1: If the priority of the uplink data channel is higher than the priority of the at least one uplink control channel and the UCI carried on the at least one uplink control channel includes target CSI and the second HARQ-ACK information, the UE multiplexes the target CSI and the second HARQ-ACK information on the uplink data channel.

Step 202*b*2: If the priority of the uplink data channel is higher than the priority of the at least one uplink control channel and the UCI carried on the at least one uplink control channel includes target CSI and the second HARQ-ACK information, the UE drops the target CSI, and multiplexes the second HARQ-ACK information on the uplink data channel.

It can be understood that the UE may determine, according to a UCI type multiplexed on a PUSCH, to drop CSI (including dropping all CSI (including the CSI part 1 and the CSI part 2) or dropping the CSI part 2), or multiplex the CSI on the PUSCH for transmission. That is, if only an LP CSI PUCCH and an LP HARQ-ACK PUCCH overlap the PUSCH (that is, there is no HP HARQ-ACK PUCCH), the CSI is multiplexed on the PUSCH. If an HP HARQ-ACK PUCCH overlaps the PUSCH, the UE may drop the CSI part2, and multiplexes the CSI part 1 on the PUSCH; or the UE may drop all the CSI.

Optionally, in another implementation of this embodiment of this application, the at least one piece of UCI is the UCI carried on the at least one uplink control channel, and the first target information includes the type information of the UCI carried on the at least one uplink control channel. The foregoing step 202 may be specifically implemented by the following step 202c or step 202d.

Step 202c: If the UCI carried on the at least one uplink control channel includes the first CSI, the second CSI, the first HARQ-ACK information, and the second HARQ-ACK information, the UE drops the second CSI, and multiplexes the first CSI, the first HARQ-ACK information, and the second HARQ-ACK information on the uplink data channel.

Optionally, in this implementation, the first target information further includes the priority information. If the priority of the uplink data channel is higher than (lower than) a priority of a part of the at least one uplink control channel and is equal to a priority of the other part of the at least one uplink control channel, and the UCI carried on the at least one uplink control channel includes the first CSI, the second CSI, the first HARQ-ACK information, and the second HARQ-ACK information, the UE drops the second CSI, and multiplex the first CSI, the first HARQ-ACK information, and the second HARQ-ACK information on the uplink data channel.

It should be noted that in this implementation, that the priority of the uplink data channel is higher than a priority of a part of the at least one uplink control channel and is equal to a priority of the other part of the at least one uplink control channel may be understood as: the priority of the uplink data channel (HP PUSCH) is higher than a priority of an uplink control channel (LP CSI PUCCH or LP HARQ-ACK PUCCH) that carries the first CSI, the second CSI, and the second HARQ-ACK information and is equal to a priority of an uplink control channel (HP HARQ-ACK PUCCH) that carries the first HARQ-ACK information.

Step 202d: If the UCI carried on the at least one uplink control channel includes the first CSI, the second CSI, the first HARQ-ACK information, and the second HARQ-ACK information, the UE drops the first CSI and the second CSI, and multiplexes the first HARQ-ACK information and the second HARQ-ACK information on the uplink data channel.

Optionally, in still another implementation of this embodiment of this application, the at least one piece of UCI is the UCI carried on the at least one uplink control channel, and the first target information includes the priority information and the type information of the UCI carried on the at least one uplink control channel. The foregoing step 202 may be specifically implemented by the following step 202e, step 202f, or step 202g.

Step 202e: If the priority of the uplink data channel is higher than the priority of the at least one uplink control channel and the UCI carried on the at least one uplink control channel includes the second HARQ-ACK information, the UE multiplexes the second HARQ-ACK information on the uplink data channel.

It should be noted that in this implementation, the UE may multiplex all the second HARQ-ACK information on the uplink data channel, or the UE may multiplex some bits of the second HARQ-ACK information (for example, HARQ-ACK information of the preset number of bits in the following embodiment) on the uplink data channel.

Optionally, in this embodiment of this application, that "the UE multiplexes the second HARQ-ACK information on the uplink data channel" in step 202e may be specifically implemented by the following step 202e1 or step 202e2.

Step 202e1: If the number of bits of the second HARQ-ACK information is less than or equal to the preset number of bits, the UE multiplexes the second HARQ-ACK information on the uplink data channel.

Step 202e2: The UE multiplexes HARQ-ACK information of the preset number of bits in the second HARQ-ACK information on the uplink data channel, and drops HARQ-ACK information of the another number of bits in the second HARQ-ACK information.

Optionally, in this embodiment of this application, that "the UE multiplexes the second HARQ-ACK information on the uplink data channel" in step 202e may be replaced with the following step 202e3.

Step 202e3: If the number of bits of the second HARQ-ACK information is greater than the preset number of bits, the UE drops the second HARQ-ACK information.

Step 202f: If the priority of the uplink data channel is higher than the priority of the at least one uplink control channel and the UCI carried on the at least one uplink control channel includes the second HARQ-ACK information, the UE performs compression processing on the second HARQ-ACK information.

Optionally, in this embodiment of this application, that "the UE performs compression processing on the second HARQ-ACK information" in step 202f may be specifically implemented by the following step 202f1 or step 202f2.

Step 202f1: If the number of bits of the second HARQ-ACK information is greater than the preset number of bits, the UE performs compression processing on the second HARQ-ACK information until the number of bits of the second HARQ-ACK information obtained after the compression processing is less than or equal to the preset number of bits, and multiplexes the second HARQ-ACK information obtained after the compression processing on the uplink data channel.

Step 202f2: If the number of bits of the second HARQ-ACK information is greater than the preset number of bits, the UE performs compression processing on the second HARQ-ACK information, and in a case that the number of bits of the compressed second HARQ-ACK information is less than or equal to the preset number of bits, multiplexes the second HARQ-ACK information obtained after the compression processing on the uplink data channel; otherwise, drops the second HARQ-ACK information.

Step 202g: If the priority of the uplink data channel is higher than the priority of the at least one uplink control channel and the UCI carried on the at least one uplink control channel includes the second HARQ-ACK information, the UE processes the second HARQ-ACK information according to third target information.

In this embodiment of this application, the third target information is target indication information or target time information, the target indication information is used to indicate whether the second HARQ-ACK information is allowed to be multiplexed on the uplink data channel, and the target time information is used to indicate a transmission time of uplink grant information corresponding to the uplink data channel and a receiving time of DCI corresponding to the second HARQ-ACK information.

Optionally, in this embodiment of this application, the target indication information may be indicated by a network device, so that the UE can determine whether to multiplex the second HARQ-ACK information on the uplink data channel for transmission or drop the second HARQ-ACK information.

Optionally, in this embodiment of this application, the target indication information may be specifically a higher layer signaling indication, for example, instructing to multiplex an LP-HARQ-ACK on an HP-PUSCH; or the target indication information may be specifically a dynamic information indication, for example, scheduling DCI in an uplink grant (UL grant) or a HARQ-ACK of a PUSCH to instruct whether to allow an HP HARQ-ACK to be multiplexed on a PUSCH.

Optionally, in this embodiment of this application, the third target information is the target time information. That "the UE processes the second HARQ-ACK information according to third target information" in the foregoing step 202g may be specifically implemented by the following step 202g1, step 202g2, or step 202g3.

Step 202g1: If the receiving time of the DCI corresponding to the second HARQ-ACK information is earlier than or equal to the transmission time of the uplink grant information corresponding to the uplink data channel, the UE multiplexes the second HARQ-ACK information on the uplink data channel.

It should be noted that, that the receiving time of the DCI corresponding to the second HARQ-ACK information is earlier than or equal to the transmission time of the uplink grant information corresponding to the uplink data channel may be understood as: a receiving time of DCI corresponding to a PUCCH carrying the second HARQ-ACK is earlier than or equal to the transmission time of the uplink grant information corresponding to the uplink data channel; or a receiving time of DCI corresponding to all HARQ-ACK in the second HARQ-ACK information is earlier than or equal to the transmission time of the uplink grant information corresponding to the uplink data channel.

It should be noted that, that a receiving time of DCI corresponding to a HARQ-ACK is earlier than or equal to the transmission time of the uplink grant information corresponding to the uplink data channel may be understood as: a start/end symbol of a control resource set (CORESET) in which the DCI corresponding to the HARQ-ACK is located is earlier than or equal to a start/end symbol of a CORESET in which the uplink grant information corresponding to the uplink data channel is located.

Step 202g2: If the receiving time of the DCI corresponding to the second HARQ-ACK information is later than the transmission time of the uplink grant information corresponding to the uplink data channel, the UE drops the second HARQ-ACK information.

It should be noted that, that the receiving time of the DCI corresponding to the second HARQ-ACK information is later than the transmission time of the uplink grant information corresponding to the uplink data channel may be understood as: a receiving time of DCI corresponding to a PUCCH carrying the second HARQ-ACK is later than the transmission time of the uplink grant information corresponding to the uplink data channel; or a receiving time of the second HARQ-ACK including HARQ-ACK with corresponding DCI is later than the transmission time of the uplink grant information corresponding to the uplink data channel.

Step 202g3: If the receiving time of the DCI corresponding to the second HARQ-ACK information is later than the transmission time of the uplink grant information corresponding to the uplink data channel, the UE multiplexes a target part of HARQ-ACK information on the uplink data channel, and drops the remaining part of HARQ-ACK information.

In this embodiment of this application, the target part of HARQ-ACK information is a part of HARQ-ACK information that is in the second HARQ-ACK information and whose receiving time of corresponding DCI is earlier than or equal to the transmission time of the uplink grant information corresponding to the uplink data channel, and the remaining part of HARQ-ACK information is HARQ-ACK information other than the target part of HARQ-ACK information in the second HARQ-ACK information.

Optionally in still another implementation of this embodiment of this application, the at least one piece of UCI is the UCI carried on the at least one uplink control channel, and the first target information includes the priority information and the type information of the UCI carried on the at least one uplink control channel. The foregoing step 202 may be specifically implemented by the following step 202h, step 202i, step 202j, or step 202k.

Step 202h: If the priority of the uplink data channel is lower than the priority of the at least one uplink control channel and the UCI carried on the at least one uplink control channel includes the first HARQ-ACK information, the UE multiplexes the first HARQ-ACK information on the uplink data channel.

Step 202i: If the priority of the uplink data channel is lower than a priority of a part of the at least one uplink control channel and is equal to a priority of the other part of the at least one uplink control channel, and the UCI carried on the at least one uplink control channel includes the first HARQ-ACK information and fourth target information, the UE multiplexes the first HARQ-ACK information and the fourth target information on the uplink data channel.

In this embodiment of this application, the fourth target information is the second HARQ-ACK information or the target CSI.

It should be noted that in this implementation, that the priority of the uplink data channel is lower than a priority of a part of the at least one uplink control channel and is equal to a priority of the other part of the at least one uplink control channel may be understood as: the priority of the uplink data channel (HP PUSCH) is lower than a priority of an uplink control channel (HP HARQ-ACK PUCCH) that carries the first HARQ-ACK information and is equal to a priority of an uplink control channel (LP HARQ-ACK PUCCH or LP CSI PUCCH) that carries the second HARQ-ACK information or the target CSI.

Step 202k: If the priority of the uplink data channel is lower than a priority of a part of the at least one uplink control channel and is equal to a priority of the other part of the at least one uplink control channel, and the UCI carried on the at least one uplink control channel includes the first HARQ-ACK information, the second HARQ-ACK information, and target CSI, the UE drops the target CSI, and multiplexes the first HARQ-ACK information and the second HARQ-ACK information on the uplink data channel.

Optionally, in still another implementation of this embodiment of this application, the at least one piece of UCI is the UCI carried on the at least one uplink control channel, and the first target information includes the priority information, the type information of the information carried on the uplink data channel, and the type information of the UCI carried on the at least one uplink control channel. The foregoing step 202 may be specifically implemented by the following step 202*l* or step 202*m*.

Step 202*l*: If the priority of the uplink data channel is higher than the priority of the at least one uplink control channel, the uplink data channel carries the A-CSI/the SP-CSI, and the UCI carried on the at least one uplink control channel includes the second HARQ-ACK information, the UE multiplexes the second HARQ-ACK information on the uplink data channel.

In this embodiment of this application, in a case that a time domain resource of an HP PUSCH (with A-CSI/SP-CSI) overlaps that of an LP HARQ-ACK PUCCH, the UE may multiplex an LP HARQ-ACK on the HP PUSCH for transmission.

Step 202*m*: If the priority of the uplink data channel is higher than the priority of the at least one uplink control channel, the uplink data channel carries the A-CSI/the SP-CSI, and the UCI carried on the at least one uplink control channel includes the second HARQ-ACK information, the UE processes the second HARQ-ACK information according to target indication information.

In this embodiment of this application, the target indication information is used to indicate whether the second HARQ-ACK information is allowed to be multiplexed on the uplink data channel.

It should be noted that for specific descriptions of the target indication information, refer to the descriptions in the foregoing embodiment. Details are not described herein again.

Optionally, in still another implementation of this embodiment of this application, the at least one piece of UCI is the UCI carried on the at least one uplink control channel, and the first target information includes the type information of the information carried on the uplink data channel and the type information of the UCI carried on the at least one uplink control channel. The foregoing step 202 may be specifically implemented by the following step 202*n*, step 202*o*, or step 202*p*.

Step 202*n*: If the uplink data channel carries the A-CSI/the SP-CSI and the UCI carried on the at least one uplink control channel includes the first HARQ-ACK information and the second HARQ-ACK information, the UE drops the second HARQ-ACK information, and multiplexes the first HARQ-ACK information on the uplink data channel.

Optionally, in this implementation, the first target information further includes the priority information. If the priority of the uplink data channel is higher than (lower than) a priority of a part of the at least one uplink control channel and is equal to a priority of the other part of the at least one uplink control channel, the uplink data channel carries the A-CSI/the SP-CSI, and the UCI carried on the at least one uplink control channel includes the first HARQ-ACK information and the second HARQ-ACK information, the UE drops the second HARQ-ACK information, and multiplexes the first HARQ-ACK information on the uplink data channel.

It should be noted that in this implementation, that the priority of the uplink data channel is higher than (lower than) a priority of a part of the at least one uplink control channel and is equal to a priority of the other part of the at least one uplink control channel may be understood as: the priority of the uplink data channel (HP PUSCH) is higher than a priority of an uplink control channel (LP HARQ-ACK PUCCH) that carries the second HARQ-ACK information and is equal to a priority of an uplink control channel (HP HARQ-ACK PUCCH) that carries the first HARQ-ACK information.

Step 202*o*: If the uplink data channel carries the A-CSI/the SP-CSI, the UCI carried on the at least one uplink control channel includes the first HARQ-ACK information and the second HARQ-ACK information, and the A-CSI/the SP-CSI includes two parts of CSI, the UE drops the second HARQ-ACK information, and multiplexes the first HARQ-ACK information on the uplink data channel.

Optionally, in this implementation, the first target information further includes the priority information. If the priority of the uplink data channel is higher than (lower than) a priority of a part of the at least one uplink control channel and is equal to a priority of the other part of the at least one uplink control channel, the uplink data channel carries the A-CSI/the SP-CSI, he UCI carried on the at least one uplink control channel includes the first HARQ-ACK information and the second HARQ-ACK information, and the A-CSI/the SP-CSI includes two parts of CSI, the UE drops the second HARQ-ACK information, and multiplexes the first HARQ-ACK information on the uplink data channel.

Step 202*p*: If the uplink data channel carries the A-CSI/the SP-CSI, the UCI carried on the at least one uplink control channel includes the first HARQ-ACK information and the second HARQ-ACK information, and the A-CSI/the SP-CSI includes the first CSI and does not include the second CSI, the UE multiplexes the first HARQ-ACK information and the second HARQ-ACK information on the uplink data channel.

Optionally, in this implementation, the first target information further includes the priority information. If the priority of the uplink data channel is higher than (lower than) a priority of a part of the at least one uplink control channel and is equal to a priority of the other part of the at least one uplink control channel, the uplink data channel carries the A-CSI/the SP-CSI, the UCI carried on the at least one uplink control channel includes the first HARQ-ACK information and the second HARQ-ACK information, and the A-CSI/the SP-CSI includes the first CSI and does not include the second CSI, the UE multiplexes the first HARQ-ACK information and the second HARQ-ACK information on the uplink data channel.

Optionally, in this embodiment of this application, if the uplink data channel carries the A-CSI/the SP-CSI, and the at least one piece of UCI includes the target CSI, the UE drops the target CSI, and transmits the uplink data channel.

Optionally, in this embodiment of this application, if the uplink data channel carries the A-CSI/the SP-CSI, the UE does not expect the time domain resource of the uplink data channel to overlap the time domain resource of the uplink control channel corresponding to the first HARQ-ACK information and the second HARQ-ACK information.

Optionally, in still another implementation of this embodiment of this application, the at least one piece of UCI is the UCI carried on the at least one uplink control channel, and the first target information includes the priority information, the type information of the information carried on the uplink data channel, and the type information of the UCI carried on the at least one uplink control channel. The foregoing step 202 may be specifically implemented by the following step 202*q*, step 202*r*, or step 202*s*.

Step 202*q*: If the priority of the uplink data channel is lower than the priority of the at least one uplink control channel, the uplink data channel carries the A-CSI/the SP-CSI, and the UCI carried on the at least one uplink control channel includes the first HARQ-ACK information, the UE multiplexes the first HARQ-ACK information on the uplink data channel.

Step 202r: If the priority of the uplink data channel is higher than the priority of the at least one uplink control channel, the uplink data channel carries the UL-SCH, and the UCI carried on the at least one uplink control channel includes the SR, the UE drops the SR, and transmits the uplink data channel; or the UE multiplexes the SR on the uplink data channel.

Step 202s: If the priority of the uplink data channel is lower than the priority of the at least one uplink control channel, the uplink data channel carries the UL-SCH, and the UCI carried on the at least one uplink control channel includes the SR, the UE multiplexes the SR on the uplink data channel; or the UE transmits the SR on the uplink data channel in a puncturing manner.

Optionally, in this embodiment of this application, if the priority of the uplink data channel is equal to the priority of the at least one uplink control channel, the uplink data channel carries the UL-SCH, and the UCI carried on the at least one uplink control channel includes the SR, the UE drops the SR, and transmits the uplink data channel.

Optionally, in still another implementation of this embodiment of this application, the at least one piece of UCI includes the UCI carried on the uplink data channel and the UCI carried on the at least one uplink control channel, and the first target information includes the type information of the information carried on the uplink data channel and the type information of the UCI carried on the at least one uplink control channel. The foregoing step 202 may be specifically implemented by the following step 202t.

Step 202t: If the uplink data channel carries the A-CSI/the SP-CSI, the UCI carried on the at least one uplink control channel includes the first HARQ-ACK information and the second HARQ-ACK information, and the A-CSI/the SP-CSI includes two parts of CSI, the UE drops a second part of CSI in the A-CSI/the SP-CSI, and multiplexes the first HARQ-ACK information and the second HARQ-ACK information on the uplink data channel.

Optionally, in this implementation, the first target information further includes the priority information. If the priority of the uplink data channel is higher than (lower than) a priority of a part of the at least one uplink control channel and is equal to a priority of the other part of the at least one uplink control channel, the uplink data channel carries the A-CSI/the SP-CSI, the UCI carried on the at least one uplink control channel includes the first HARQ-ACK information and the second HARQ-ACK information, and the A-CSI/the SP-CSI includes two parts of CSI, the UE drops the second part of CSI in the A-CSI/the SP-CSI, and multiplexes the first HARQ-ACK information and the second HARQ-ACK information on the uplink data channel.

Optionally, in still another implementation of this embodiment of this application, the at least one piece of UCI includes the UCI carried on the uplink data channel and the UCI carried on the at least one uplink control channel, and the first target information includes the priority information, the type information of the information carried on the uplink data channel, and the type information of the UCI carried on the at least one uplink control channel. The foregoing step 202 may be specifically implemented by the following step 202u.

Step 202u: If the priority of the uplink data channel is lower than a priority of a part of the at least one uplink control channel and is equal to a priority of the other part of the at least one uplink control channel, the uplink data channel carries the A-CSI/the SP-CSI, and the UCI carried on the at least one uplink control channel includes the first HARQ-ACK information and the second HARQ-ACK information, the UE drops the A-CSI/the SP-CSI, and multiplexes the first HARQ-ACK information and the second HARQ-ACK information on the uplink data channel.

The following describes in detail, by using specific embodiments and schematic diagrams, a method for multiplexing a plurality of types of UCI on the uplink data channel in this embodiment of this application.

Embodiment 1

Figure 2:
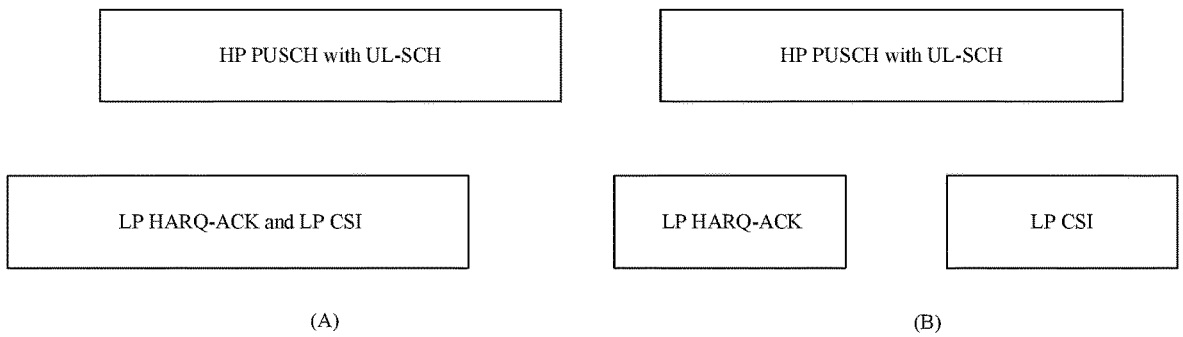
FIG. 2 is a first schematic diagram of an example in which a resource of a PUCCH overlaps that of a PUSCH according to an embodiment of this application.

As shown in FIG. 2, a high-priority PUSCH (HP PUSCH with UL-SCH for short) that carries a UL-SCH and does not carry A-CSI/SP-CSI conflicts with a PUCCH that carries a LP HARQ-ACK and LP CSI (that is, time domain resources overlap). In (A) in FIG. 2, the LP HARQ-ACK and the LP CSI are carried on one PUCCH. In (B) in FIG. 2, the LP HARQ-ACK and the LP CSI are carried on different PUCCHs.

In this scenario, the UCI and the PUSCH may be transmitted by using any one of the following methods:

Method 1: The UE multiplexes only the LP HARQ-ACK on the HP PUSCH for transmission, and drops the LP CSI.

Method 2: The UE multiplexes both the LP HARQ-ACK and the LP CSI on the HP PUSCH for transmission.

Figure 3:
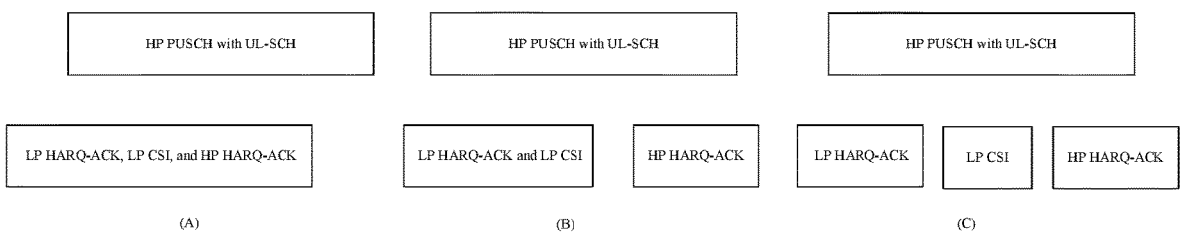
FIG. 3 is a second schematic diagram of an example in which a resource of a PUCCH overlaps that of a PUSCH according to an embodiment of this application.

Further, as shown in FIG. 3, if a time domain resource of the HP PUSCH with UL-SCH further overlaps with a time domain resource of a HP HARQ-ACK PUCCH or the HP HARQ-ACK is multiplexed on the HP PUSCH with UL-SCH, the UE drops the CSI, and multiplexes the HP HARQ-ACK and the LP HARQ-ACK on the PUSCH, or if the LP CSI includes a CSI part 2, the UE drops the CSI part 2 of the LP CSI, and multiplexes a CSI part 1 included in the LP CSI, the LP HARQ-ACK, and the HP HARQ-ACK on the PUSCH. In (A) in FIG. 3, the LP HARQ-ACK, the LP CSI, and the HP HARQ-ACK are carried on one PUCCH. In (B) in FIG. 3, the LP HARQ-ACK and the LP CSI are carried on one PUCCH, and the HP HARQ-ACK is carried on another PUCCH. In (C) in FIG. 3, the LP HARQ-ACK, the LP CSI, and the HP HARQ-ACK are carried on different PUCCHs.

Embodiment 2

Figure 4:
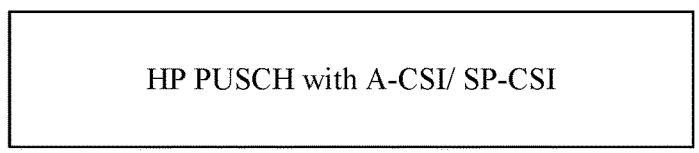
FIG. 4 is a third schematic diagram of an example in which a resource of a PUCCH overlaps that of a PUSCH according to an embodiment of this application.
Figure 4:
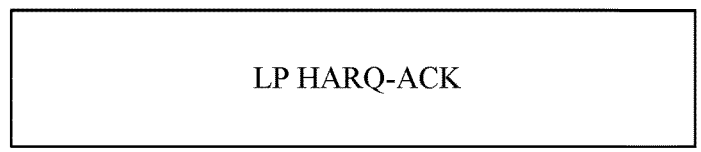

As shown in FIG. 4, a high-priority PUSCH (HP PUSCH with A-CSI/SP-CSI for short) that carries A-CSI/SP-CSI conflicts with a PUCCH that carries an LP HARQ-ACK.

In this scenario, any one of the following methods may be used to transmit UCI and a PUSCH:

Method 3: The UE multiplexes the LP HARQ-ACK on the HP PUSCH for transmission.

Method 4: Determine, according to an instruction of a base station, to multiplex the LP HARQ-ACK on the HP PUSCH for transmission or drop the LP HARQ-ACK.

In this embodiment of this application, the instruction of the base station may be indicated by using a higher-layer parameter, for example, a multiplexing (multiplexing) LP HARQ-ACK on HP PUSCH or DCI, for example, a UL grant for scheduling a PUSCH or DCI corresponding to a HARQ-ACK.

It should be noted that when the LP HARQ-ACK overlaps a time domain resource of an HP PUSCH that carries information (UL-SCH or A-CSI/SP-CSI), or overlaps a time domain resource of a HP PUSCH that does not carry the information (UL-SCH or A-CSI/SP-CSI), the UE may process the LP HARQ-ACK according to Method 4.

In the foregoing method, the base station may instruct to multiplex the LP HARQ-ACK on the HP PUSCH, and the UE multiplexes the LP HARQ-ACK on the HP PUSCH. If an HP HARQ-ACK PUCCH overlaps the HP PUSCH in this case, or an HP HARQ-ACK is also multiplexed on the HP PUSCH, the UE may process the CSI and the HP HARQ-ACK by using any one of the following methods:

Method 5: The UE drops the LP HARQ-ACK, and multiplexes the CSI and the HP HARQ-ACK on the PUSCH.

Method 6: If the CSI includes a CSI part 2, the UE drops the LP HARQ-ACK, and multiplexes the CSI and the HP HARQ-ACK on the PUSCH. Otherwise, the UE multiplexes the LP HARQ-ACK, the CSI, and the HP HARQ-ACK on the PUSCH.

Method 7: If the CSI includes the CSI part 2, the UE drops the CSI part 2, and multiplexes the LP HARQ-ACK, the HP HARQ-ACK, and a CSI part 1 on the PUSCH.

Method 8: The UE does not expect a time domain resource of the PUSCH to overlap the time domain resource of the LP HARQ-ACK, that is, the UE does not expect the HP PUSCH that overlaps the LP HARQ-ACK to trigger the A-CSI. That is, during scheduling, a network side should ensure that the time domain resource of the high-priority PUSCH triggering the A-CSI does not overlap that of the low priority-PUCCH carrying the HARQ-ACK.

Embodiment 3

Figure 5:
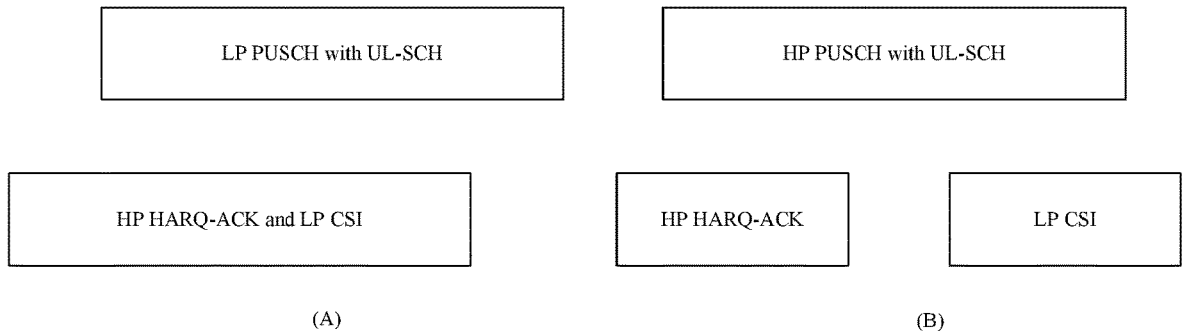
FIG. 5 is a fourth schematic diagram of an example in which a resource of a PUCCH overlaps that of a PUSCH according to an embodiment of this application.

As shown in FIG. 5, a low-priority PUSCH (LP PUSCH with UL-SCH for short) that carries a UL-SCH and does not carry A-CSI/SP-CSI conflicts with a PUCCH that carries an HP HARQ-ACK and LP CSI.

In this scenario, any one of the following methods may be used to transmit UCI and a PUSCH:

Method 9: The UE multiplexes only the HP HARQ-ACK on the LP PUSCH for transmission, and drops the LP CSI.

Method 10: The UE multiplexes both the HP HARQ-ACK and the LP CSI on the LP PUSCH for transmission.

Further, if the LP PUSCH with UL-SCH is further overlapped with the LP HARQ-ACK PUCCH, or the LP HARQ-ACK is further multiplexed on the LP PUSCH with UL-SCH, the UE may drop the LP CSI; or in a case that the LP CSI includes a CSI part 2, the UE may drop the CSI part 2 of the LP CSI, and multiplex a CSI part 1 of the LP CSI and the LP HARQ-ACK on the PUSCH.

Embodiment 4

Figure 6:
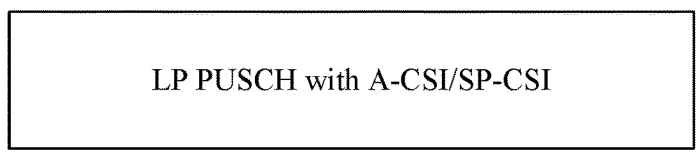
FIG. 6 is a fifth schematic diagram of an example in which a resource of a PUCCH overlaps that of a PUSCH according to an embodiment of this application.
Figure 6:
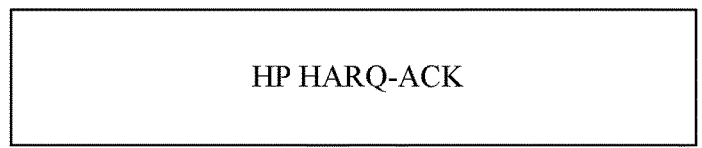

As shown in FIG. 6, a low-priority PUSCH (LP PUSCH with A-CSI/SP-CSI for short) that carries A-CSI/SP-CSI and does not carry a UL-SCH conflicts with a PUCCH that carries an HP HARQ-ACK (that is, time domain resources overlap).

In this scenario, the UE may multiplex the HP HARQ-ACK on the LP PUSCH for transmission.

Figure 7:
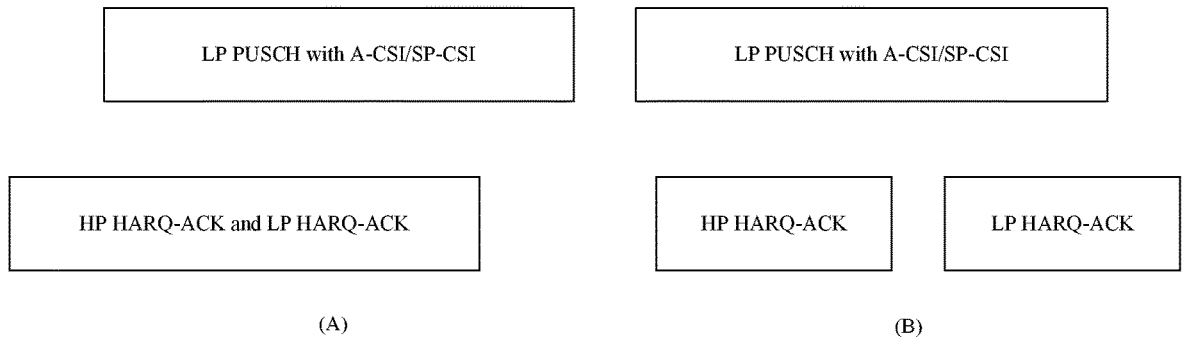
FIG. 7 is a sixth schematic diagram of an example in which a resource of a PUCCH overlaps that of a PUSCH according to an embodiment of this application.

Further, as shown in FIG. 7, if a time domain resource of the LP PUSCH with A-CSI/SP-CSI further overlaps that of an LP HARQ-ACK PUCCH (that is, the LP PUSCH with A-CSI/SP-CSI overlaps a PUCCH with an HP HARQ-ACK and an LP HARQ-ACK), or the LP HARQ-ACK needs to be multiplexed on the PUSCH, the UCI and the PUSCH may be transmitted by using any one of the following methods:

Method 11: The UE multiplexes only the HP HARQ-ACK and the LP HARQ-ACK on the LP PUSCH for transmission, and drops the LP CSI.

Method 12: If the CSI does not include a CSI part 2, the UE multiplexes the LP CSI, the HP HARQ-ACK and the LP HARQ-ACK on the LP PUSCH for transmission. Otherwise, the UE drops the LP HRQ-ACK, and transmits the LP CSI and the HP HARQ-ACK on the LP PUSCH.

Method 13: The UE multiplexes both the LP HARQ-ACK and the LP CSI on the HP PUSCH for transmission. If the LP CSI includes the CSI part 2, the UE drops the CSI part 2 of the LP CSI.

Method 14: The UE does not expect a time domain resource of the PUSCH to overlap that of the LP HARQ-ACK and that of the HP HARQ-ACK. That is, during scheduling, a network side should ensure that a scenario in which the time domain resource of the LP PUSCH with A-CSI/SP-CSI overlaps with that of the LP HARQ-ACK and that of the HP HARQ-ACK does not occur.

In (A) in FIG. 7, the HP HARQ-ACK and the LP HARQ-ACK are carried on one PUCCH. In (B) in FIG. 7, the HP HARQ-ACK and the LP HARQ-ACK are carried on different PUCCHs.

Embodiment 5

UE may determine, according to an instruction of a base station, to multiplex an LP HARQ-ACK on a PUSCH for transmission or drop the LP HARQ-ACK.

The UE may determine, according to a transmission time of DCI corresponding to the HARQ-ACK and a transmission time of a UL grant corresponding to the PUSCH, to drop the LP HARQ-ACK or multiplex the LP HARQ-ACK on an HP PUSCH (which may be multiplexed after binding or may be directly multiplexed, and is not limited in this embodiment of this application). For example, if the DCI corresponding to the LP HARQ-ACK is after the UL grant, the UE drops the LP PUSCH; otherwise, the UE multiplexes the LP HARQ-ACK on the HP PUSCH.

That the transmission time of the DCI is after that of the UL grant may be understood as follows: an end/start symbol of a PDCCH/CORESET in which the DCI is located is after an end/start symbol of a PDCCH/CORESET in which the UL grant is located.

Figure 8:
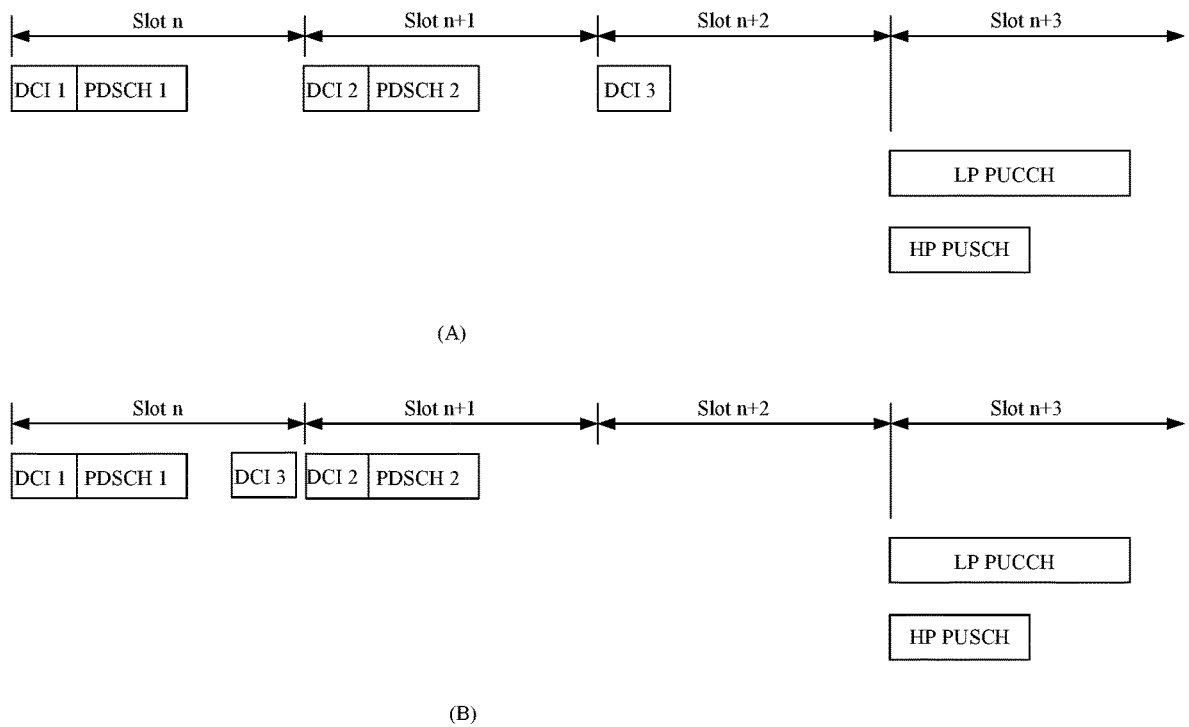
FIG. 8 is a seventh schematic diagram of an example in which a resource of a PUCCH overlaps that of a PUSCH according to an embodiment of this application.

As shown in FIG. 8, DCI 1 and DCI 2 are used to respectively schedule a PDSCH 1 and a PDSCH 2, and instruct the UE to feed back a HARQ-ACK of the PDSCH 1 and a HARQ-ACK of the PDSCH 2 in a slot (slot) n+3, where HARQ-ACK codebooks corresponding to the HARQ-ACKs are a first codebook, that is, the HARQ-ACKs corresponding to the PDSCH 1 and the PDSCH 2 correspond to one HARQ-ACK codebook and are associated with a low-priority PUCCH, that is, the LP PUCCH in FIG. 8 (a resource of the LP PUCCH is determined by using a last piece of DCI for feeding back the HARQ-ACK, that is, the DCI 2, and therefore, it may be considered that DCI corresponding to the LP PUCCH is the DCI 2). DCI 3 is used to schedule the HP PUSCH to be transmitted in the slot n+3, and a time domain resource of the LP PUCCH overlaps that of the HP PUSCH.

In (A) in FIG. 8, if the DCI corresponding to the LP PUCCH, that is, the DCI 2, is before the UL grant corresponding to the PUSCH, that is, the DCI 3, the UE may multiplex the HARQ-ACK on the PUSCH. In (B) in FIG. 8, if the DCI 2 is before the DCI 3, the UE cannot multiplex the HARQ-ACK on the PUSCH, and the UE drops the HARQ-ACK, and transmits the PUSCH; or the UE multiplexes a HARQ-ACK of a PDSCH 1 before the DCI 3 on the PUSCH, and drops a HARQ-ACK of a PDSCH 2 after the DCI 3.

It should be noted that the information processing method provided in the embodiments of this application may be performed by UE or an information processing apparatus, or a control module that is in the information processing apparatus and that is configured to perform and load the information processing method. In the embodiments of this application, that the UE performs and loads the information processing method is used as an example to describe the information processing method provided in the embodiments of this application.

Figure 9:
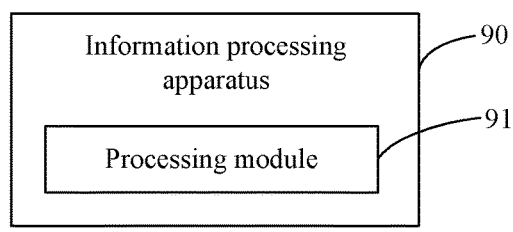
FIG. 9 is a schematic structural diagram of an information processing apparatus according to an embodiment of this application.

FIG. 9 is a possible schematic structural diagram of an information processing apparatus according to an embodiment of this application. As shown in FIG. 9, an information processing apparatus 90 may include a processing module 91.

The processing module 91 is configured to: in a case that a time domain resource of an uplink data channel overlaps that of at least one uplink control channel, process at least one piece of UCI according to first target information, where the at least one piece of UCI is UCI carried on the at least one uplink control channel, or the at least one piece of UCI includes UCI carried on the uplink data channel and UCI carried on the at least one uplink control channel, and the first target information includes at least one of the following: priority information, type information of information carried on the uplink data channel, or type information of the UCI carried on the at least one uplink control channel, where the priority information is used to indicate a priority of the uplink data channel and a priority of the at least one uplink control channel.

In a possible implementation, the UCI carried on the at least one uplink control channel includes at least one of the following types of information: first HARQ-ACK information, second HARQ-ACK information, first CSI, second CSI, or an SR, where the first HARQ-ACK information is HARQ-ACK information carried on a high-priority uplink control channel, the second HARQ-ACK information is HARQ-ACK information carried on a low-priority uplink control channel, the first CSI is a first part of a CSI report, and the second CSI is a second part of the CSI report; and the information carried on the uplink data channel includes any one of the following types of information: A-CSI, SP-CSI, a UL-SCH, and second target information, where the second target information includes A-CSI and a UL-SCH.

In a possible implementation, the at least one piece of UCI is the UCI carried on the at least one uplink control channel, and the first target information includes the priority information and the type information of the UCI carried on the at least one uplink control channel. The processing module 91 is specifically configured to:

if the priority of the uplink data channel is higher than the priority of the at least one uplink control channel and the UCI carried on the at least one uplink control channel includes target CSI, drop the target CSI, and transmit the uplink data channel;

or if the priority of the uplink data channel is higher than the priority of the at least one uplink control channel and the UCI carried on the at least one uplink control channel includes target CSI and the second HARQ-ACK information, multiplex the target CSI and the second HARQ-ACK information on the uplink data channel; or drop the target CSI, and multiplex the second HARQ-ACK information on the uplink data channel, where The target CSI is the first CSI, or the target CSI includes the first CSI and the second CSI.

In a possible implementation, the at least one piece of UCI is the UCI carried on the at least one uplink control channel, and the first target information includes the type information of the UCI carried on the at least one uplink control channel. The processing module 91 is specifically configured to: if the UCI carried on the at least one uplink control channel includes the first CSI, the second CSI, the first HARQ-ACK information, and the second HARQ-ACK information, drop the second CSI, and multiplex the first CSI, the first HARQ-ACK information, and the second HARQ-ACK information on the uplink data channel; or drop the first CSI and the second CSI, and multiplex the first HARQ-ACK information and the second HARQ-ACK information on the uplink data channel.

In a possible implementation, the at least one piece of UCI is the UCI carried on the at least one uplink control channel, and the first target information includes the priority information and the type information of the UCI carried on the at least one uplink control channel. The processing module 91 is specifically configured to: if the priority of the uplink data channel is higher than the priority of the at least one uplink control channel and the UCI carried on the at least one uplink control channel includes the second HARQ-ACK information, multiplex the second HARQ-ACK information on the uplink data channel; or perform compression processing on the second HARQ-ACK information; or process the second HARQ-ACK information according to third target information, where the third target information is target indication information or target time information, the target indication information is used to indicate whether the second HARQ-ACK information is allowed to be multiplexed on the uplink data channel, and the target time information is used to indicate a transmission time of uplink grant information corresponding to the uplink data channel and a receiving time of DCI corresponding to the second HARQ-ACK information.

In a possible implementation, the processing module 91 is specifically configured to: if the number of bits of the second HARQ-ACK information is less than or equal to the preset number of bits, multiplex the second HARQ-ACK information on the uplink data channel; or multiplex HARQ-ACK information of the preset number of bits in the second HARQ-ACK information on the uplink data channel, and drop HARQ-ACK information of the another number of bits in the second HARQ-ACK information.

In a possible implementation, the processing module 91 is further configured to: if the number of bits of the second HARQ-ACK information is greater than the preset number of bits, drop the second HARQ-ACK information.

In a possible implementation, the processing module 91 is specifically configured to: if the number of bits of the second HARQ-ACK information is greater than the preset number of bits, perform compression processing on the second HARQ-ACK information until the number of bits of the second HARQ-ACK information obtained after the compression processing is less than or equal to the preset number of bits, and multiplex the second HARQ-ACK information obtained after the compression processing on the uplink data channel; or perform compression processing on the second HARQ-ACK information, and in a case that the number of bits of the compressed second HARQ-ACK information is less than or equal to the preset number of bits, multiplex the second HARQ-ACK information obtained after the compression processing on the uplink data channel; otherwise, drop the second HARQ-ACK information.

In a possible implementation, the third target information is target time information. The processing module 91 is specifically configured to:

if the receiving time of the DCI corresponding to the second HARQ-ACK information is earlier than or equal to the transmission time of the uplink grant information corresponding to the uplink data channel, multiplex the second HARQ-ACK information on the uplink data channel;

or if the receiving time of the DCI corresponding to the second HARQ-ACK information is later than the transmission time of the uplink grant information corresponding to the uplink data channel, drop the second HARQ-ACK information; or multiplex a target part of HARQ-ACK information on the uplink data channel, and drop the remaining part of HARQ-ACK information, where the target part of HARQ-ACK information is a part of HARQ-ACK information that is in the second HARQ-ACK information and whose receiving time of corresponding DCI is earlier than or equal to the transmission time of the uplink grant information corresponding to the uplink data channel, and the remaining part of HARQ-ACK information is HARQ-ACK information other than the target part of HARQ-ACK information in the second HARQ-ACK information.

In a possible implementation, the at least one piece of UCI is the UCI carried on the at least one uplink control channel, and the first target information includes the priority information and the type information of the UCI carried on the at least one uplink control channel. The processing module 91 is specifically configured to: if the priority of the uplink data channel is lower than the priority of the at least one uplink control channel and the UCI carried on the at least one uplink control channel includes the first HARQ-ACK information, multiplex the first HARQ-ACK information on the uplink data channel; or if the priority of the uplink data channel is lower than a priority of a part of the at least one uplink control channel and is equal to a priority of the other part of the at least one uplink control channel, and the UCI carried on the at least one uplink control channel includes the first HARQ-ACK information and fourth target information, multiplex the first HARQ-ACK information and the fourth target information on the uplink data channel, where the fourth target information is the second HARQ-ACK information or target CSI; or if the priority of the uplink data channel is lower than a priority of a part of the at least one uplink control channel and is equal to a priority of the other part of the at least one uplink control channel, and the UCI carried on the at least one uplink control channel includes the first HARQ-ACK information, the second HARQ-ACK information, and target CSI, drop the target CSI, and multiplex the first HARQ-ACK information and the second HARQ-ACK information on the uplink data channel. The target CSI is the first CSI, or the target CSI includes the first CSI and the second CSI.

In a possible implementation, the at least one piece of UCI is the UCI carried on the at least one uplink control channel, and the first target information includes the priority information, the type information of the information carried on the uplink data channel, and the type information of the UCI carried on the at least one uplink control channel; and the processing module 91 is specifically configured to: if the priority of the uplink data channel is higher than the priority of the at least one uplink control channel, the uplink data channel carries the A-CSI/the SP-CSI, and the UCI carried on the at least one uplink control channel includes the second HARQ-ACK information, multiplex the second HARQ-ACK information on the uplink data channel; or process the second HARQ-ACK information according to target indication information, where the target indication information is used to indicate whether the second HARQ-ACK information is allowed to be multiplexed on the uplink data channel.

In a possible implementation, the at least one piece of UCI is the UCI carried on the at least one uplink control channel, and the first target information includes the type information of the information carried on the uplink data channel and the type information of the UCI carried on the at least one uplink control channel. The processing module 91 is specifically configured to: if the uplink data channel carries the A-CSI/the SP-CSI and the UCI carried on the at least one uplink control channel includes the first HARQ-ACK information and the second HARQ-ACK information, drop the second HARQ-ACK information, and multiplex the first HARQ-ACK information on the uplink data channel; or if the uplink data channel carries the A-CSI/the SP-CSI, the UCI carried on the at least one uplink control channel includes the first HARQ-ACK information and the second HARQ-ACK information, and the A-CSI/the SP-CSI includes two parts of CSI, drop the second HARQ-ACK information, and multiplex the first HARQ-ACK information on the uplink data channel; or if the uplink data channel carries the A-CSI/the SP-CSI, the UCI carried on the at least one uplink control channel includes the first HARQ-ACK information and the second HARQ-ACK information, and the A-CSI/the SP-CSI includes the first CSI and does not include the second CSI, multiplex the first HARQ-ACK information and the second HARQ-ACK information on the uplink data channel.

In a possible implementation, the at least one piece of UCI is the UCI carried on the at least one uplink control channel, and the first target information includes the priority information, the type information of the information carried on the uplink data channel, and the type information of the UCI carried on the at least one uplink control channel. The processing module 91 is specifically configured to: if the priority of the uplink data channel is lower than the priority of the at least one uplink control channel, the uplink data channel carries the A-CSI/the SP-CSI, and the UCI carried on the at least one uplink control channel includes the first HARQ-ACK information, multiplex the first HARQ-ACK information on the uplink data channel.

In a possible implementation, the at least one piece of UCI is the UCI carried on the at least one uplink control channel, and the first target information includes the priority information, the type information of the information carried on the uplink data channel, and the type information of the UCI carried on the at least one uplink control channel. The processing module 91 is specifically configured to:

if the priority of the uplink data channel is higher than the priority of the at least one uplink control channel, the uplink data channel carries the UL-SCH, and the UCI carried on the at least one uplink control channel includes the SR, drop the SR, and transmit the uplink data channel; or multiplex the SR on the uplink data channel;

or if the priority of the uplink data channel is lower than the priority of the at least one uplink control channel, the uplink data channel carries the UL-SCH, and the UCI carried on the at least one uplink control channel includes the SR, multiplex the SR on the uplink data channel; or transmit the SR on the uplink data channel in a puncturing manner.

In a possible implementation, the at least one piece of UCI includes the UCI carried on the uplink data channel and the UCI carried on the at least one uplink control channel, and the first target information includes the type information of the information carried on the uplink data channel and the type information of the UCI carried on the at least one uplink control channel. The processing module 91 is specifically configured to: if the uplink data channel carries the A-CSI/the SP-CSI, the UCI carried on the at least one uplink control channel includes the first HARQ-ACK information and the second HARQ-ACK information, and the A-CSI/the SP-CSI includes two parts of CSI, drop a second part of CSI in the A-CSI/the SP-CSI, and multiplex the first HARQ-ACK information and the second HARQ-ACK information on the uplink data channel.

In a possible implementation, the at least one piece of UCI includes the UCI carried on the uplink data channel and the UCI carried on the at least one uplink control channel, and the first target information includes the priority information, the type information of the information carried on the uplink data channel, and the type information of the UCI carried on the at least one uplink control channel. The processing module 91 is specifically configured to: if the priority of the uplink data channel is lower than a priority of a part of the at least one uplink control channel and is equal to a priority of the other part of the at least one uplink control channel, the uplink data channel carries the A-CSI/the SP-CSI, and the UCI carried on the at least one uplink control channel includes the first HARQ-ACK information and the second HARQ-ACK information, drop the A-CSI/the SP-CSI, and multiplex the first HARQ-ACK information and the second HARQ-ACK information on the uplink data channel.

According to the information processing apparatus provided in this embodiment of this application, for an uplink control channel and an uplink data channel corresponding to different priorities, when a time domain resource of the uplink control channel overlaps that of the uplink data channel, UE may process at least one piece of UCI according to priority information of a channel, type information of information carried on the uplink data channel, and/or type information of UCI carried on the uplink control channel, to transmit some or all UCI carried on the uplink data channel. That is, a possibility of transmitting low-priority information is improved while ensuring transmission of a high-priority channel, thereby reducing impact on performance of low-priority uplink transmission. In this way, performance of uplink transmission can be improved.

The information processing apparatus in this embodiment of this application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a laptop computer, a palmtop computer, an in-vehicle electronic terminal, a wearable device, an UMPC, a netbook, or a PDA. The non-mobile electronic device may be a server, a network attached storage (NAS), a personal computer (PC), a television (TV), an automated teller machine, or a self-service machine. This is not specifically limited in this embodiment of this application.

The information processing apparatus in this embodiment of this application may be an apparatus with an operating system. The operating system may be an Android (Android) operating system, an iOS operating system, or another possible operating system. This is not specifically limited in this embodiment of this application.

The information processing apparatus provided in this embodiment of this application can implement the processes implemented by the UE in the foregoing method embodiment. To avoid repetition, details are not described herein again.

Figure 10:
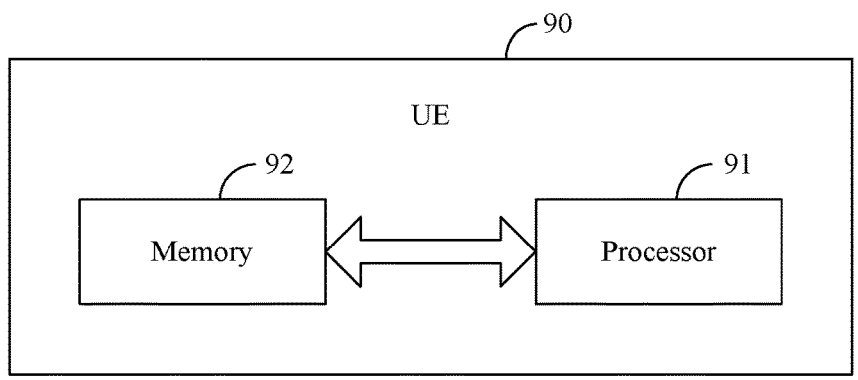
FIG. 10 is a first schematic structural diagram of hardware of UE according to an embodiment of this application.

Optionally, as shown in FIG. 10, an embodiment of this application further provides UE 90, including a processor 91, a memory 92, and a program or an instruction that is stored in the memory 92 and that can be run on the processor 91. When the program or the instruction is executed by the processor 91, the processes of the foregoing method embodiment are implemented and a same technical effect can be achieved. To avoid repetition, details are not described herein again.

It should be noted that the UE in this embodiment of this application includes the foregoing mobile electronic device and the foregoing non-mobile electronic device.

Figure 11:
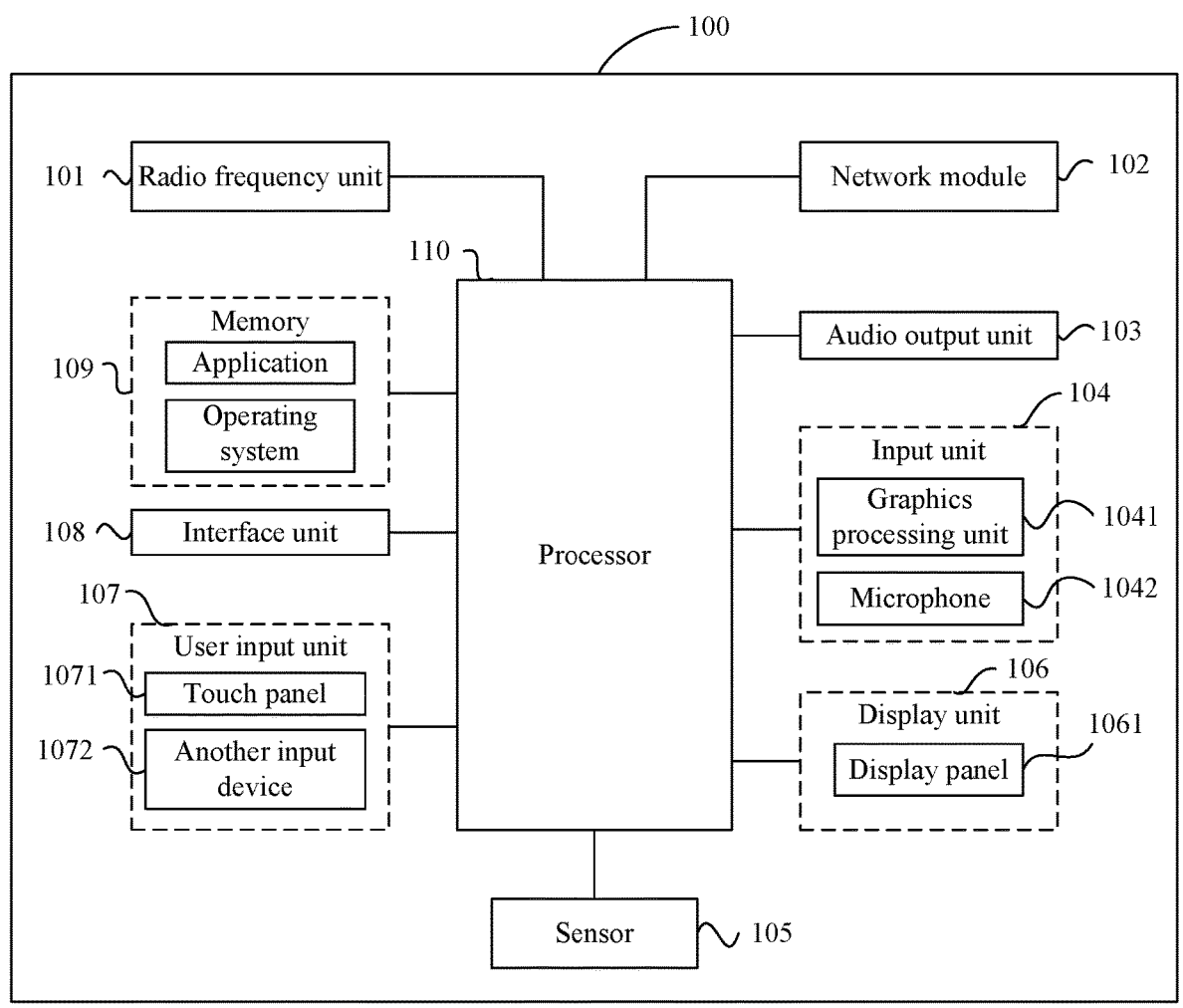
FIG. 11 is a second schematic structural diagram of hardware of UE according to an embodiment of this application.

FIG. 11 is a schematic structural diagram of hardware of UE according to an embodiment of this application.

UE 100 includes but is not limited to components such as a radio frequency unit 101, a network module 102, an audio output unit 103, an input unit 104, a sensor 105, a display unit 106, a user input unit 107, an interface unit 108, a memory 109, and a processor 110.

A person skilled in the art can understand that the UE 100 may further include a power supply (such as a battery) that supplies power to each component. The power supply may be logically connected to the processor 110 by using a power supply management system, to implement functions such as charging and discharging management, and power consumption management by using the power supply management system. The structure of the UE shown in FIG. 11 constitutes no limitation on the UE, and the UE may include more or fewer components than those shown in the figure, or combine some components, or have different component arrangements. Details are not described herein.

The processor 110 is configured to: in a case that a time domain resource of an uplink data channel overlaps that of at least one uplink control channel, process at least one piece of UCI according to first target information, where the at least one piece of UCI is UCI carried on the at least one uplink control channel, or the at least one piece of UCI includes UCI carried on the uplink data channel and UCI carried on the at least one uplink control channel, and the first target information includes at least one of the following: priority information, type information of information carried on the uplink data channel, or type information of the UCI carried on the at least one uplink control channel, where the priority information is used to indicate a priority of the uplink data channel and a priority of the at least one uplink control channel.

According to the UE provided in this embodiment of this application, for an uplink control channel and an uplink data channel corresponding to different priorities, when a time domain resource of the uplink control channel overlaps that of the uplink data channel, UE may process at least one piece of UCI according to priority information of a channel, type information of information carried on the uplink data channel, and/or type information of UCI carried on the uplink control channel, to transmit some or all UCI carried on the uplink data channel. That is, a possibility of transmitting low-priority information is improved while ensuring transmission of a high-priority channel, thereby reducing impact on performance of low-priority uplink transmission. In this way, performance of uplink transmission can be improved.

It should be understood that, in this embodiment of this application, the input unit 104 may include a graphics processing unit (GPU) 1041 and a microphone 1042, and the graphics processing unit 1041 processes image data of a still picture or a video obtained by an image capture apparatus (such as a camera) in a video capture mode or an image capture mode. The display unit 106 may include a display panel 1061. Optionally, the display panel 1061 may be configured in a form such as a liquid crystal display or an organic light-emitting diode. The user input unit 107 includes a touch panel 1071 and another input device 1072. The touch panel 1071 is also referred to as a touchscreen. The touch panel 1071 may include two parts: a touch detection apparatus and a touch controller. The another input device 1072 may include but is not limited to a physical keyboard, a functional button (such as a volume control button or a power on/off button), a trackball, a mouse, and a joystick. Details are not described herein. The memory 109 may be configured to store a software program and various data, including but not limited to an application and an operating system. An application processor and a modem processor may be integrated into the processor 110, the application processor mainly processes an operating system, a user interface, an application, and the like, and the modem processor mainly processes wireless communication. It can be understood that, alternatively, the modem processor may not be integrated into the processor 110.

An embodiment of this application further provides a readable storage medium. The readable storage medium stores a program or an instruction, and when the program or the instruction is executed by a processor, the processes of the foregoing method embodiment are implemented and a same technical effect can be achieved. To avoid repetition, details are not described herein again.

The processor is a processor in the UE in the foregoing embodiment. The readable storage medium includes a computer-readable storage medium, such as a computer read-only memory (ROM), a random access memory (RAM), a magnetic disk, or an optical disc.

An embodiment of this application further provides a chip. The chip includes a processor and a communications interface, the communications interface is coupled to the processor, and the processor is configured to run a program or an instruction to implement the processes of the foregoing method embodiment, and a same technical effect can be achieved. To avoid repetition, details are not described herein again.

It should be understood that the chip mentioned in this embodiment of this application may also be referred to as a system-level chip, a system chip, a chip system, or an on-chip system chip.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of this application essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, a network device, or the like) to perform the methods described in the embodiments of this application.

The embodiments of this application are described above with reference to the accompanying drawings, but this application is not limited to the above specific implementations, and the above specific implementations are only illustrative and not restrictive. Under the enlightenment of this application, those of ordinary skill in the art can make many forms without departing from the purpose of this application and the protection scope of the claims, all of which fall within the protection of this application.

The invention claimed is:

1. An information processing method, wherein the method comprises:

in a case that a time domain resource of an uplink data channel overlaps that of at least one uplink control channel, processing, by user equipment (UE), at least one piece of uplink control information (UCI) according to first target information, wherein the at least one piece of UCI is UCI carried on the at least one uplink control channel, and the first target information comprises at least one of the following: priority information, type information of information carried on the uplink data channel, or type information of the UCI carried on the at least one uplink control channel, wherein the priority information is used to indicate a priority of the uplink data channel and a priority of the at least one uplink control channel;

the UCI carried on the at least one uplink control channel comprises at least one of the following types of information: first hybrid automatic repeat request-acknowledgment (HARQ-ACK) information, second HARQ-ACK information, first channel state information (CSI), second CSI, or a scheduling request (SR), wherein the first HARQ-ACK information is HARQ-ACK information carried on a high-priority uplink control channel, the second HARQ-ACK information is HARQ-ACK information carried on a low-priority uplink control channel, the first CSI is a first part of a CSI report, and the second CSI is a second part of the CSI report; and the information carried on the uplink data channel comprises any one of the following types of information: aperiodic channel state information (A-CSI), semi-persistent channel state information (SP-CSI), an uplink shared channel (UL-SCH), and second target information, wherein the second target information comprises A-CSI and a UL-SCH;

wherein the first target information comprises the priority information and the type information of the UCI carried on the at least one uplink control channel, and the processing, by UE, at least one piece of uplink control information (UCI) according to first target information comprises:

if the priority of the uplink data channel is higher than the priority of the at least one uplink control channel and the UCI carried on the at least one uplink control channel comprises target CSI, dropping, by the UE, the target CSI, and transmitting the uplink data channel;

or if the priority of the uplink data channel is higher than the priority of the at least one uplink control channel and the UCI carried on the at least one uplink control channel comprises target CSI and the second HARQ-ACK information, dropping, by the UE, the target CSI, and multiplexing the second HARQ-ACK information on the uplink data channel, wherein the target CSI comprises the first CSI and the second CSI;

or wherein the first target information comprises the priority information and the type information of the UCI carried on the at least one uplink control channel, and the processing, by UE, at least one piece of uplink control information (UCI) according to first target information comprises:

if the priority of the uplink data channel is lower than the priority of the at least one uplink control channel and the UCI carried on the at least one uplink control channel comprises the first HARQ-ACK information, multiplexing, by the UE, the first HARQ-ACK information on the uplink data channel;

or if the priority of the uplink data channel is lower than a priority of a part of the at least one uplink control channel and is equal to a priority of the other part of the at least one uplink control channel, and the UCI carried on the at least one uplink control channel comprises the first HARQ-ACK information and fourth target information, multiplexing, by the UE, the first HARQ-ACK information and the fourth target information on the uplink data channel, wherein the fourth target information is target CSI, wherein the target CSI is the first CSI, or the target CSI comprises the first CSI and the second CSI.

2. The method according to claim 1, wherein the processing, by UE, at least one piece of uplink control information (UCI) according to first target information further comprises:

if the priority of the uplink data channel is higher than the priority of the at least one uplink control channel and the UCI carried on the at least one uplink control channel comprises the second HARQ-ACK information, multiplexing, by the UE, the second HARQ-ACK information on the uplink data channel; or performing, by the UE, compression processing on the second HARQ-ACK information; or processing, by the UE, the second HARQ-ACK information according to third target information, wherein the third target information is target indication information or target time information, the target indication information is used to indicate whether the second HARQ-ACK information is allowed to be multiplexed on the uplink data channel, and the target time information is used to indicate a transmission time of uplink grant information corresponding to the uplink data channel and a receiving time of DCI corresponding to the second HARQ-ACK information;

wherein the multiplexing, by the UE, the second HARQ-ACK information on the uplink data channel comprises:

if the number of bits of the second HARQ-ACK information is less than or equal to the preset number of bits, multiplexing, by the UE, the second HARQ-ACK information on the uplink data channel;

or multiplexing, by the UE, HARQ-ACK information of the preset number of bits in the second HARQ-ACK information on the uplink data channel, and dropping HARQ-ACK information of the another number of bits in the second HARQ-ACK information;

wherein the method further comprises:

if the number of bits of the second HARQ-ACK information is greater than the preset number of bits, dropping, by the UE, the second HARQ-ACK information;

or multiplexing, by the UE, HARQ-ACK information of the preset number of bits in the second HARQ-ACK information on the uplink data channel, and dropping the remaining second HARQ-ACK information;

or, wherein the performing, by the UE, compression processing on the second HARQ-ACK information comprises:

if the number of bits of the second HARQ-ACK information is greater than the preset number of bits, performing, by the UE, compression processing on the second HARQ-ACK information until the number of bits of the second HARQ-ACK information obtained after the compression processing is less than or equal to the preset number of bits, and multiplexing the second HARQ-ACK information obtained after the compression processing on the uplink data channel; or performing, by the UE, compression processing on the second HARQ-ACK information, and in a case that the number of bits of the compressed second HARQ-ACK information is less than or equal to the preset number of bits, multiplexing the second HARQ-ACK information obtained after the compression processing on the uplink data channel; otherwise, dropping the second HARQ-ACK information;

or, wherein the third target information is the target time information; and processing, by the UE, the second HARQ-ACK information according to third target information comprises:

if the receiving time of the DCI corresponding to the second HARQ-ACK information is earlier than or equal to the transmission time of the uplink grant information corresponding to the uplink data channel, multiplexing, by the UE, the second HARQ-ACK information on the uplink data channel;

or if the receiving time of the DCI corresponding to the second HARQ-ACK information is later than the transmission time of the uplink grant information corresponding to the uplink data channel, dropping, by the UE, the second HARQ-ACK information; or multiplexing, by the UE, a target part of HARQ-ACK information on the uplink data channel, and dropping the remaining part of HARQ-ACK information, wherein the target part of HARQ-ACK information is a part of HARQ-ACK information that is in the second HARQ-ACK information and whose receiving time of corresponding DCI is earlier than or equal to the transmission time of the uplink grant information corresponding to the uplink data channel, and the remaining part of HARQ-ACK information is HARQ-ACK information other than the target part of HARQ-ACK information in the second HARQ-ACK information.

3. An information processing method, wherein the method comprises:

in a case that a time domain resource of an uplink data channel overlaps that of at least one uplink control channel, processing, by user equipment (UE), at least one piece of uplink control information (UCI) according to first target information, wherein the at least one piece of UCI is UCI carried on the at least one uplink control channel, and the first target information comprises at least one of the following: priority information, type information of information carried on the uplink data channel, or type information of the UCI carried on the at least one uplink control channel, wherein the priority information is used to indicate a priority of the uplink data channel and a priority of the at least one uplink control channel;

the UCI carried on the at least one uplink control channel comprises at least one of the following types of information: first hybrid automatic repeat request-acknowledgment (HARQ-ACK) information, second HARQ-ACK information, first channel state information (CSI), second CSI, or a scheduling request (SR), wherein the first HARQ-ACK information is HARQ-ACK information carried on a high-priority uplink control channel, the second HARQ-ACK information is HARQ-ACK information carried on a low-priority uplink control channel, the first CSI is a first part of a CSI report, and the second CSI is a second part of the CSI report; and the information carried on the uplink data channel comprises any one of the following types of information: aperiodic channel state information (A-CSI), semi-persistent channel state information (SP-CSI), an uplink shared channel (UL-SCH), and second target information, wherein the second target information comprises A-CSI and a UL-SCH;

wherein the first target information comprises the priority information, the type information of the information carried on the uplink data channel, and the type information of the UCI carried on the at least one uplink control channel; and the processing, by UE, at least one piece of uplink control information (UCI) according to first target information comprises:

if the priority of the uplink data channel is lower than the priority of the at least one uplink control channel, the uplink data channel carries the A-CSI/the SP-CSI, and the UCI carried on the at least one uplink control channel comprises the first HARQ-ACK information, multiplexing, by the UE, the first HARQ-ACK information on the uplink data channel.

4. An information processing method, wherein the method comprises:

in a case that a time domain resource of an uplink data channel overlaps that of at least one uplink control channel, processing, by user equipment (UE), at least one piece of uplink control information (UCI) according to first target information, wherein the at least one piece of UCI is UCI carried on the at least one uplink control channel, or the at least one piece of UCI comprises UCI carried on the uplink data channel and UCI carried on the at least one uplink control channel, and the first target information comprises at least one of the following: priority information, type information of information carried on the uplink data channel, or type information of the UCI carried on the at least one uplink control channel, wherein the priority information is used to indicate a priority of the uplink data channel and a priority of the at least one uplink control channel;

the UCI carried on the at least one uplink control channel comprises at least one of the following types of information: first hybrid automatic repeat request-acknowledgment (HARQ-ACK) information, second HARQ-ACK information, first channel state information (CSI), second CSI, or a scheduling request (SR), wherein the first HARQ-ACK information is HARQ-ACK information carried on a high-priority uplink control channel, the second HARQ-ACK information is HARQ-ACK information carried on a low-priority uplink control channel, the first CSI is a first part of a CSI report, and the second CSI is a second part of the CSI report; and the information carried on the uplink data channel comprises any one of the following types of information: aperiodic channel state information (A-CSI), semi-persistent channel state information (SP-CSI), an uplink shared channel (UL-SCH), and second target information, wherein the second target information comprises A-CSI and a UL-SCH;

wherein the at least one piece of UCI is the UCI carried on the at least one uplink control channel, and the first target information comprises the type information of the UCI carried on the at least one uplink control channel; and the processing, by UE, at least one piece of uplink control information (UCI) according to first target information comprises:

if the UCI carried on the at least one uplink control channel comprises the first CSI, the second CSI, the first HARQ-ACK information, and the second HARQ-ACK information, dropping, by the UE, the first CSI and the second CSI, and multiplexing the first HARQ-ACK information and the second HARQ-ACK information on the uplink data channel; or wherein the at least one piece of UCI is the UCI carried on the at least one uplink control channel, and the first target information comprises the type information of the information carried on the uplink data channel and the type information of the UCI carried on the at least one uplink control channel; and the processing, by UE, at least one piece of uplink control information (UCI) according to first target information comprises:

if the uplink data channel carries the A-CSI/the SP-CSI and the UCI carried on the at least one uplink control channel comprises the first HARQ-ACK information and the second HARQ-ACK information, dropping, by the UE, the second HARQ-ACK information, and multiplexing the first HARQ-ACK information on the uplink data channel;

or if the uplink data channel carries the A-CSI/the SP-CSI, the UCI carried on the at least one uplink control channel comprises the first HARQ-ACK information and the second HARQ-ACK information, and the A-CSI/the SP-CSI comprises two parts of CSI, dropping, by the UE, the second HARQ-ACK information, and multiplexing the first HARQ-ACK information on the uplink data channel;

or if the uplink data channel carries the A-CSI/the SP-CSI, the UCI carried on the at least one uplink control channel comprises the first HARQ-ACK information and the second HARQ-ACK information, and the A-CSI/the SP-CSI comprises the first CSI and does not comprise the second CSI, multiplexing, by the UE, the first HARQ-ACK information and the second HARQ-ACK information on the uplink data channel;

or wherein the at least one piece of UCI comprises the UCI carried on the uplink data channel and the UCI carried on the at least one uplink control channel, and the first target information comprises the type information of the information carried on the uplink data channel and the type information of the UCI carried on the at least one uplink control channel; and the processing, by UE, at least one piece of uplink control information (UCI) according to first target information comprises:

if the uplink data channel carries the A-CSI/the SP-CSI, the UCI carried on the at least one uplink control channel comprises the first HARQ-ACK information and the second HARQ-ACK information, and the A-CSI/the SP-CSI comprises two parts of CSI, dropping, by the UE, a second part of CSI in the A-CSI/the SP-CSI, and multiplexing the first HARQ-ACK information and the second HARQ-ACK information on the uplink data channel.

5. The method according to claim 3, wherein the processing, by UE, at least one piece of uplink control information (UCI) according to first target information further comprises:

if the priority of the uplink data channel is higher than the priority of the at least one uplink control channel, the uplink data channel carries the A-CSI/the SP-CSI, and the UCI carried on the at least one uplink control channel comprises the second HARQ-ACK information, multiplexing, by the UE, the second HARQ-ACK information on the uplink data channel; or processing, by the UE, the second HARQ-ACK information according to target indication information, wherein the target indication information is used to indicate whether the second HARQ-ACK information is allowed to be multiplexed on the uplink data channel.

6. The method according to claim 3, wherein the processing, by UE, at least one piece of uplink control information (UCI) according to first target information further comprises:

if the priority of the uplink data channel is higher than the priority of the at least one uplink control channel, the uplink data channel carries the UL-SCH, and the UCI carried on the at least one uplink control channel comprises the SR, dropping, by the UE, the SR, and transmitting the uplink data channel; or multiplexing, by the UE, the SR on the uplink data channel.

7. An information processing apparatus, wherein the information processing apparatus comprises a memory, a processor and a computer program stored in the memory and executable by the processor, wherein the computer program, when executed by the processor, causes the processor to implement the method according to claim 1.

8. A non-transitory readable storage medium, wherein the readable storage medium stores a program, which, when executed by a processor, causes the processor to implement the method according to claim 1.

9. An information processing apparatus, wherein the information processing apparatus comprises a memory, a processor and a computer program stored in the memory and executable by the processor, wherein the computer program, when executed by the processor, causes the processor to implement the method according to claim 4.

10. An information processing apparatus, wherein the information processing apparatus comprises a memory, a processor and a computer program stored in the memory and executable by the processor, wherein the computer program, when executed by the processor, causes the processor to implement the method according to claim 3.

11. A non-transitory readable storage medium, wherein the readable storage medium stores a program, which, when executed by a processor, causes the processor to implement the method according to claim 4.

12. A non-transitory readable storage medium, wherein the readable storage medium stores a program, which, when executed by a processor, causes the processor to implement the method according to claim 3.

* * * * *